Jan. 16, 1962          E. KLEIN          3,017,034
COMBINED RACK AND TABLE STRUCTURE
Filed Jan. 30, 1961          3 Sheets-Sheet 1
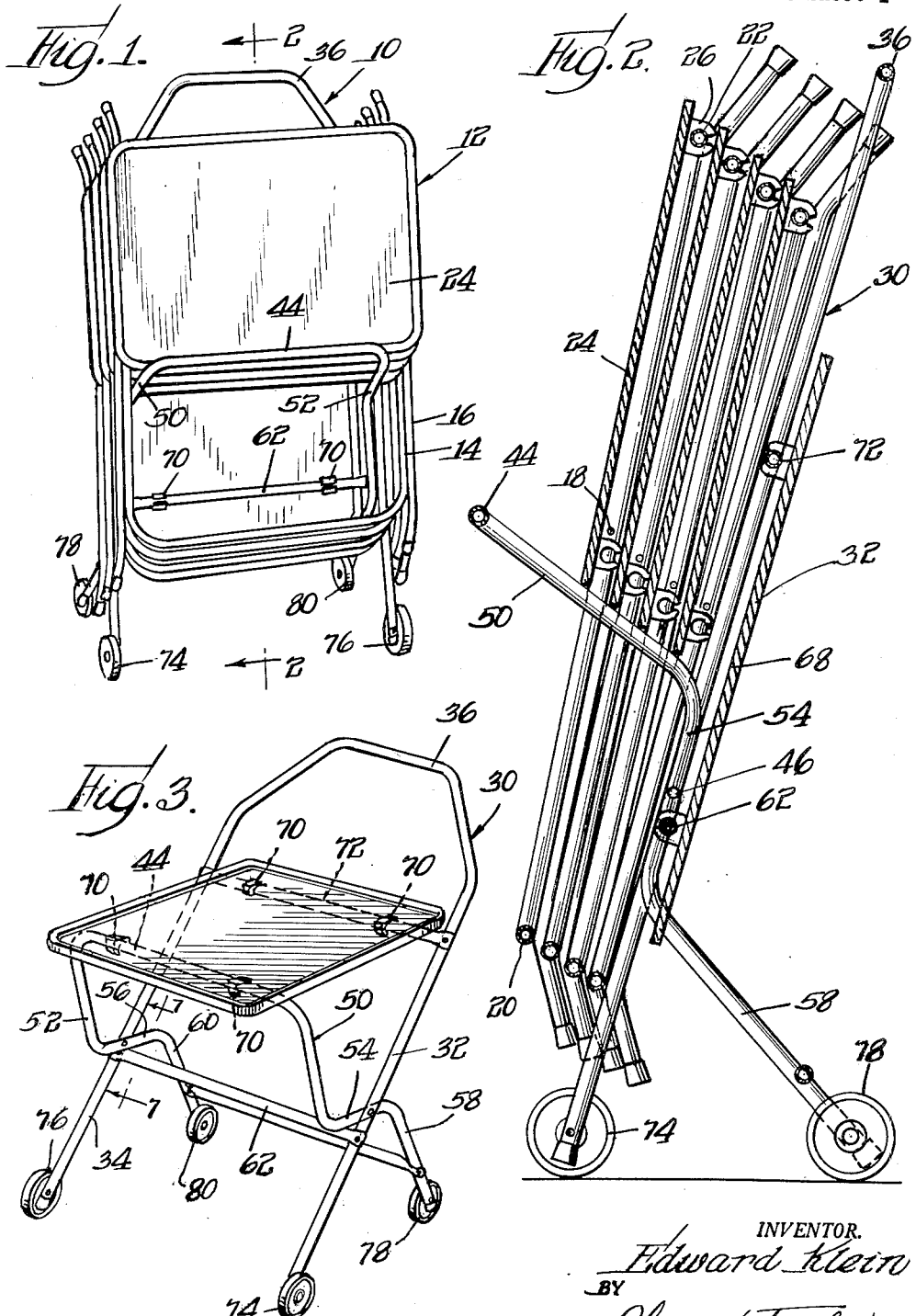
INVENTOR.
Edward Klein
BY
Olson & Trexler
attys

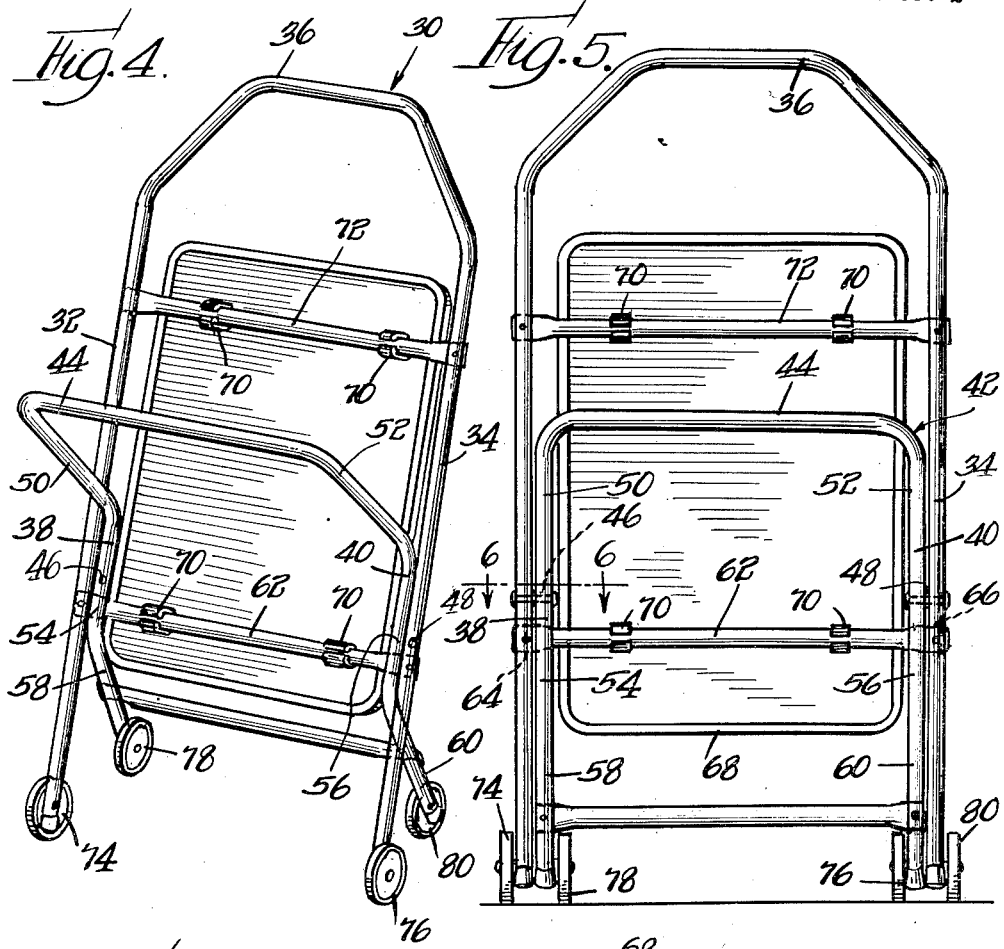

Jan. 16, 1962 E. KLEIN 3,017,034
COMBINED RACK AND TABLE STRUCTURE
Filed Jan. 30, 1961 3 Sheets-Sheet 3
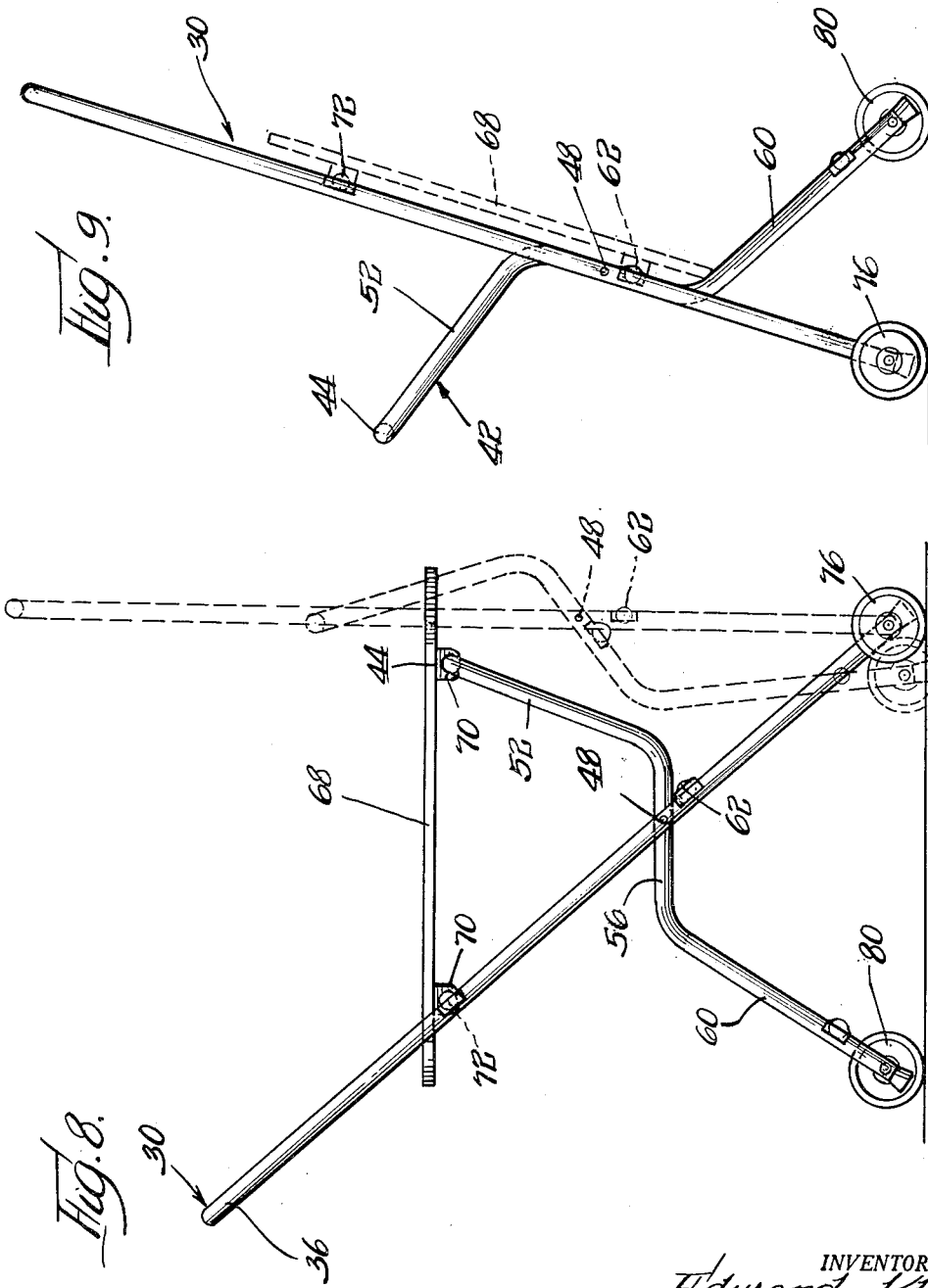
INVENTOR.
Edward Klein
BY
Olson & Trexler
Attys United States Patent Office 3,017,034
Patented Jan. 16, 1962

3,017,034
COMBINED RACK AND TABLE STRUCTURE
Edward Klein, Wilmette, Ill., assignor to Quaker Stretcher Company, Kenosha, Wis., a corporation of Wisconsin
Filed Jan. 30, 1961, Ser. No. 85,560
8 Claims. (Cl. 211—2)

The present invention relates to a novel furniture structure and more specifically to a novel unit adaptable for use as a serving cart or alternatively for use as a rack for supporting a plurality of folded tray tables or the like.

An important object of the present invention is to provide a novel combined rack for foldable tables and the like and serving cart which is constructed so that substantially identical tray table top members may be used for the serving cart and for the foldable tray tables, if desired.

Still another important object of the present invention is to provide a novel combined rack and serving cart having frame means which may be manipulated between a relatively upright laterally collapsed rack providing position and a relatively inclined opened serving cart or table providing position, and which frame means is constructed so that it is substantially self-supporting in both the subpositions for facilitating connection of a tray table top member thereto or removal of the top member therefrom.

Other objects and advantages of the present invention will become apparent from the following description and the accompanying drawings wherein:

FIG. 1 is a perspective view showing an assembly including a plurality of folded tray tables and a unit constructed in accordance with features of the present invention which is selectively usable as a rack as shown in FIG. 1 or as a serving cart or table;

FIG. 2 is an enlarged sectional view taken along line 2—2 in FIG. 1;

FIG. 3 is a perspective view showing a combined rack and serving table or cart constructed in accordance with the present invention in a cart providing condition;

FIG. 4 is a perspective view showing a combined rack and serving table or cart unit of the present invention in the rack providing condition;

FIG. 5 is a front elevational veiw of the unit in the rack providing condition;

FIG. 6 is an enlarged fragmentary sectional view taken along line 6—6 in FIG. 5;

FIG. 7 is an enlarged fragmentary sectional view taken generally along line 7—7 in FIG. 3;

FIG. 8 is a side elevational view showing the unit in solid lines in the serving cart or table providing condition and further showing in broken lines, the manner in which the unit may be manipulated between the cart providing condition and the rack providing condition; and FIG. 9 is a side elevational view showing the unit in the rack providing condition.

Referring now more specifically to the drawings wherein like parts are designated by the same numerals throughout the various figures, a combined rack and serving table or cart unit 10 incorporating features of the present invention is shown in a rack providing condition in FIGS. 1, 2, 4, 5 and 9 and in a serving cart or table condition in FIGS. 3 and 8. When the unit is serving as a rack, it is adapted to support and retain a plurality of folded tray tables 12 as shown in FIGS. 1 and 2. The tray tables 12 may be of various known suitable constructions and need not be described in detail herein.

It suffices to state that each of the tray tables 12 comprises a pair of generally U-shaped frame members 14 and 16 having side or leg portions pivotally connected by suitable pins 18 at locations intermediate their ends. The frame members 14 and 16 respectively include transverse bight portions 20 and 22. Tray table top members 24 are adapted to be connected between the bight portions 20 and 22 when the tray tables 12 are assembled for use. Suitable resilient clip elements 26 and 28 are secured to the underside of the tray or table top members 24 for releasable connection with the bight portions 20 and 22. As it will be understood, the clip members are also adapted to permit pivotable movement between a tray and at least one of the bight portions such as the bight portion 22 as shown in FIG. 2 so that the trays may be folded to the collapsed position shown in FIGS. 1 and 2 or alternatively to a raised horizontal position, not shown, when the tray tables are to be used.

As shown in the drawings the unit 10 comprises a first frame means 30 having opposite side or leg portions 32 and 34 joined at their upper ends by a transverse bight portion 36 which also provides a handle by which the unit may be manipulated. The frame means 30 is of generally inverted U-shape as shown best in FIGS. 4 and 5.

The opposite side or leg portions 32 and 34 are pivotally connected intermediate their ends to opposite side of leg portions 38 and 40 respectively of a second frame means 42. The second frame means 42 is also of generally inverted U-shaped appearance when viewed as shown in FIG. 5 and includes a bight portion 44 integrally joining upper ends of the leg or side portions 38 and 40. Suitable pins 46 and 48 are provided for pivotally connecting intermediate portions of the legs 32—38 and 34—40 together.

As has been previously indicated, the frame means 30 and 42 are adapted to be pivoted or manipulated between a first position shown in FIGS. 1, 2, 4, 5 and 9 in which they are adapted to provide a rack and a second position shown in FIGS. 3 and 8 in which they are adapted to provide a serving table or cart. When the frame means 30 and 42 are in the first rack providing position, the frame means 30 is substantially upright but disposed in a plane inclined rearwardly from the vertical a relatively small amount as shown best in FIGS. 2 and 9. The frame means 42 is also relatively upright as compared with the position that it occupies when in the table providing position so that the unit in the rack providing position is relatively laterally collapsed or compact for minimizing the floor space required for storage and the like. On the other hand, when the frame means 30 and 42 are in the table providing position shown in FIGS. 3 and 8, they are laterally opened up and are disposed in relatively steeply inclined positions so as to provide the table with a broader base and greater stability.

The side or leg portions of the frame means 42 respectively include upped end sections 50 and 52 inclined upwardly and forwardly from intermediate sections 54 and 56 when the unit is in the rack providing condition. The sections 50 and 52 extend forwardly of the plane of the frame means 30 and combined with the upper end portion of the frame means 30 in providing means for receiving and retaining the tray tables 20 as shown in FIGS. 1 and 2.

The side frame portions 38 and 40 also include lower end sections 58 and 60 respectively which are inclined rearwardly and downwardly from the intermediate sections 54 and 56. These lower end sections extend rearwardly from the plane of the frame means 30 so that when the unit is in the rack providing condition, the lower ends of the frame means 30 and 42 are relatively close together but are spaced apart sufficiently to provide the rack with the desired stability. It will be observed that the lower end of the frame means 30 is disposed at one side of a vertical plane containing the axis of the pivot pins 46 and 48 and the lower end of the frame means 42 is disposed at an opposite side of this plane so that the center of gravity of the unit is located approximately midway between the lower ends of the frame means.

In order to retain the frame means 30 and 42 in the relatively upright position, the frame means 30 is provided with a transverse frame member 62 extending between and secured to the opposite side leg portions 32 and 34 at a location beneath the axis of the pivot pins 46 and 48. The transverse frame member 62 serves as an abutment or stop engageable with the intermediate sections 54 and 56 of the frame means 42 for limiting pivotable movement of the frame means 30 and 42 relative to each other. As shown best in FIGS. 4, 5 and 6, opposite end portions 64 and 66 of the transverse members 62 are substantially flattened so that they serve to engage the intermediate sections 54 and 56 of the frame means 42 and locate the section substantially in the plane of the leg portions 32 and 34 of the frame means 30 when the unit is in the rack providing condition as shown best in FIGS. 2, 6 and 9.

In addition to the frame means 30 and 42, the unit 10 comprises a table top member or tray 68 which, if desired, may be substantially identical to the trays or top members 24 of the tray table 12. Thus suitable resilient clip members 70 are secured to the underside of the table top or tray 68 for detachably connecting the tray to the frame means. The frame means 30 and 42 respectively include complementary attachment portions cooperable with the clip elements 70. The attachment portion of the frame means 42 as provided by the bight portion 44. The attachment portion of the frame means 30 is provided by another transverse frame member 72 which extends between and is secured to the opposite side frame portions or legs 32 and 34. The transverse member 72 is located substantially above the axis of the pivot pins 46 and 48. More specifically the member 72 is located so that when the unit is in the table or serving cart providing condition shown in FIGS. 3 and 8, the bight portion 44 and the transverse member 72 will be located in substantially the same horizontal plane.

The unit 10 may quickly and easily be converted from the rack to the table by manually gripping the frame means 30 and 42 and pivoting them relatively to each other through the broken line position as shown in FIG. 8 and to and from the solid line positions shown in FIGS. 8 and 9. It will be noted that as the frame means are shifted between the two positions, the shorter frame means 42 will be pivoted through frame means 30. In other words the locations of the ends of the frame means 38 and 42 at opposite sides of an imaginary vertical plane containing the axis of the pivot pins 46 and 48 will be reversed when the frame means are shifted between the positions of FIGS. 8 and 9.

It is to be noted that the intermediate sections of the side or leg portions of the frame means 42 extend above the axis of the pivot pins a predetermined amount and the length and angular relationship of the upper end sections 50 and 52 are correlated with the formation of the intermediate sections 54 and 56 so that a side of an imaginary triangle provided by drawing a line between the uppermost edge of the bight portion 44 and the axis of the pivot pins 46 and 48 is substantially the same as but no greater than distance between the axis of the pivot pins and the lower edge of the transverse member 72. This arrangement enables the bight portion 44 to pass beneath the transverse member 72 as shown in FIG. 8 when the frame means are manipulated between the cart and rack providing positions.

The table top or tray 68 is removed from the frame means 30 and 42 while they are being manipulated from one position to another and this, of course, is accomplished merely by disconnecting the clips from the attachment portions or transverse elements 44 and 72. In order to aid in handling and manipulating the unit, the transverse member 62 is disposed so as to engage the intermediate sections 54 and 56 of the frame means 42 when the frame means 30 and 42 are in the table providing position shown in FIG. 8 as well as when the frame means are in the rack providing position shown in FIG. 9. Thus the frame means are self-supporting in both positions so that the tray may be more readily applied to or removed therefrom. It will be noted that the transverse or stop members 62 engages the intermediate sections of the frame means 42 beneath the pivot pins when the frame means are in the rack providing position shown in FIG. 9 and at a location at an opposite side of the pivot pins when the frame means are in the table providing position shown in FIG. 8. Preferably the table top or tray member 68 is stored when the unit is used as a rack by connecting the clip elements to the transverse members 62 and 72 as shown in FIGS. 1, 2, 4 and 5.

In order to facilitate movement of the unit 10 from one location to another, wheels 74 and 76 are connected to lower ends of the frame side or leg portions 32 and 34. Similar wheels 78 and 80 are connected to lower ends of the side or leg portions of the frame means 42. The wheels 74 and 76 are disposed along outer surfaces of their associated side frame portions while the wheels 78 and 80 are disposed along inwardly facing surfaces of their associated leg portions so that the wheels avoid interference with each other when the frame means are manipulated between the rack and table providing positions.

While the preferred embodiment of the present invention has been shown and described herein, it is obvious that many structural details may be changed without departing from the spirit and scope of the appended claims.

The invention is claimed as follows:

1. A structure selectively for use as a table and as a rack for supporting an article such as a folded tray table, comprising first and second frame means respectively including opposite side frame members pivotally connected together intermediate their ends for manual relative pivotal movement between a first crossed and relative upright and laterally collapsed position and a second crossed and relative inclined and opened position, means for retaining said frame means in said first position until said frame means are manually pivoted toward said second position, said first frame means including a transverse member extending between the side frame members thereof at a location substantially above the pivotal connection between said side frame members, said second frame means including a second transverse member extending between the side frame members thereof at a location substantially above the pivotal connection, said first mentioned transverse member and said second transverse member being disposed at opposite sides of a vertical plane containing said pivotal connection when said frame means are in said first position, the locations of said transverse members being reversed with respect to said plane when said frame means are in said second position, table top means extending substantially horizontally between said transverse members when said frame means are in said second position, and means releasably connecting said table top means with said transverse members when said frame means are in said second position.

2. A structure, as defined in claim 1, when said releasable connecting means comprises means fixed to said table top means and detachably connectable to said transverse members.

3. A structure, as defined in claim 1, which includes abutment means fixed on said first frame means, and engageable with said second frame means for maintaining said frame means in said second position until they are manually pivoted toward said first position.

4. A structure, as defined in claim 1, wherein retaining means includes abutment means on said first frame means and disposed for engaging said second frame means at one location when the frame means are in said first position and for engaging said second frame means at a second location when said frame means are in said second position for selectively maintaining said frame means in either of said positions until they are manually pivoted toward the other of said positions.

5. A structure selectively for use as a table and as a rack for supporting an article such as a folded tray table, comprising first and second frame means respectively including opposite side frame members pivotally connected together intermediate their ends for manual relative pivotal movement between a first crossed and relatively upright and laterally collapsed position and a second crossed and relatively inclined and opened position, the side frame members of said first frame means having portions disposed substantially in a common plane extending above the pivotal connection between said frame means, said side frame members of said second frame means including intermediate portions extending generally along said plane and merging with sections inclined upwardly and forwardly with respect to said plane when said frame means are in said first position, said portions of said first side frame means and said sections of the side frame members of said second frame means providing means for receiving and supporting said article when said frame means are in said first position, said first frame means including a first transverse member extending between and connected to said portions of the side frame members thereof at a location substantially in said plane and spaced a predetermined distance above said pivotal connection, said second frame means including a second transverse member extending between and connected to said sections thereof and disposed for enabling said second transverse member to pass beneath said first transverse member when said frame means are pivoted between said first and second positions and for locating both of said transverse members substantially in a common horizontal plane when said frame means are in said second position, means for maintaining said frame means in said first position until said frame means are manually pivoted toward said second position, and table top means extending generally horizontally between and supported by said transverse members when said frame means are in said second position, said table top means being detachably connectable with at least one of said transverse members.

6. A structure, as defined in claim 6, wherein said table top means includes clip means detachably connecting the table top means with both of said transverse members when said frame means are in said second position.

7. A structure selectively for use as a table and as a rack for supporting an article such as a folded tray table, the combination comprising first and second frame means each including opposite side frame members pivotally connected together intermediate their ends for manual relative pivotal movement between a first crossed and relatively upright and collapsed position and a second crossed and relatively inclined and opened position, said frame means presenting portions thereof above the pivotal connection therebetween for receiving and supporting said article when the frame means are in said first position, said first frame means including a first transverse member extending between and connected to the side frame members thereof and spaced a predetermined distance above the pivotal connection between said frame means, said second frame means including a second transverse member extending between and connected to the side frame members thereof at a location above said pivotal connection and disposed for passing immediately beneath said first transverse member when said frame means are pivoted between said first and second positions and for locating both of said transverse members substantially in a common horizontal plane when said frame means are in said second position, said first and second transverse members being adapted to support table top means when said frame means are in said second position, said first and second transverse members respectively being disposed at opposite sides of a vertical plane containing said pivotal connection when said frame means are in said first position, the locations of said transverse frame members with respect to said plane being reversed when said frame means are in said second position, and abutment means fixed to said side frame members of said one of frame means for engaging said side frame members of the others of said frame means at one location for maintaining said frame means in said first position until said frame means are manually pivoted toward said second position.

8. A combination, as defined in claim 7 wherein said abutment means comprises a third transverse frame member extending between and fixed to said side frame members of said first frame means at a location between said pivotal connection, said third transverse member being engageable with said side frame members of said second frame means at opposite sides of said pivotal connection when said frame means are respectively in said first and second positions for maintaining said frame means in said first and second positions until the frame means are manually pivoted between said positions.

References Cited in the file of this patent

UNITED STATES PATENTS

| | | |
|---|---|---|
| 2,676,709 | Walsh | Apr. 27, 1954 |
| 2,851,166 | Block | Sept. 9, 1958 |
| 2,919,809 | Dunbar | Jan. 5, 1960 |